US010621110B2

United States Patent
Bedi et al.

(10) Patent No.: US 10,621,110 B2
(45) Date of Patent: Apr. 14, 2020

(54) DETERMINISTIC MULTIFACTOR CACHE REPLACEMENT

(71) Applicant: Verizon Digital Media Services Inc., Playa Vista, CA (US)

(72) Inventors: Harkeerat Singh Bedi, Los Angeles, CA (US); Amir Reza Khakpour, Santa Monica, CA (US); Robert J. Peters, Los Angeles, CA (US)

(73) Assignee: Verizon Digital Media Services Inc., Playa Vista, CA (US)

( * ) Notice: Subject to any disclaimer, the term of this patent is extended or adjusted under 35 U.S.C. 154(b) by 0 days.

(21) Appl. No.: 16/019,056

(22) Filed: Jun. 26, 2018

(65) Prior Publication Data

US 2018/0314647 A1 Nov. 1, 2018

Related U.S. Application Data

(63) Continuation of application No. 15/153,890, filed on May 13, 2016, now Pat. No. 10,013,362.

(51) Int. Cl.
*G06F 12/123* (2016.01)
*G06F 12/0813* (2016.01)
*G06F 12/0891* (2016.01)
*H04L 29/08* (2006.01)

(52) U.S. Cl.
CPC ........ *G06F 12/123* (2013.01); *G06F 12/0813* (2013.01); *G06F 12/0891* (2013.01); *G06F 2212/163* (2013.01); *G06F 2212/60* (2013.01); *G06F 2212/601* (2013.01); *G06F 2212/62* (2013.01); *G06F 2212/70* (2013.01); *H04L 67/2852* (2013.01)

(58) Field of Classification Search
CPC .......... G06F 12/12–128; H04L 67/2842–2857
See application file for complete search history.

(56) References Cited

U.S. PATENT DOCUMENTS 8,417,892 B1 * 4/2013 Roskind .............. G06F 16/9574
711/133

* cited by examiner

*Primary Examiner* — Edward J Dudek, Jr.
*Assistant Examiner* — Andrew Russell
(74) *Attorney, Agent, or Firm* — Ansari Katiraei; Arman Kaitraei; Sadiq Ansari

(57) ABSTRACT

Some embodiments modify caching server operation to evict cached content based on a deterministic and multifactor modeling of the cached content. The modeling produces eviction scores for the cached items. The eviction scores are derived from two or more factors of age, size, cost, and content type. The eviction scores determine what content is to be evicted based on the two or more factors included in the eviction score derivation. The eviction scores modify caching server eviction operation for specific traffic or content patterns. The eviction scores further modify caching server eviction operation for granular control over an item's lifetime on cache.

16 Claims, 8 Drawing Sheets

DETERMINISTIC MULTIFACTOR CACHE REPLACEMENT

CLAIM OF BENEFIT TO RELATED APPLICATIONS

This application is a continuation of U.S. non-provisional application Ser. No. 15/153,890, entitled "DETERMINISTIC MULTIFACTOR CACHE REPLACEMENT", filed May 13, 2016. The contents of U.S. application Ser. No. 15/153,890 are hereby incorporated by reference.

BACKGROUND ART

Content caching is used by many networks and service providers to optimize the delivery of digital content. Copies of the same content are cached by different servers distributed throughout a network. When a request for the cached content comes in, the request can be routed to the optimal server that serves the requested content in the most expedient manner. The optimal server can be determined based on various criteria including geographic proximity to the user, load, available resources, etc.

Caching servers have a finite or limited amount of storage that can be used as cache. When the cache of a particular caching server is filled, already cached content is evicted from cache in order to make room for caching new content.

The caching server eviction operation significantly affects the caching server cache-hit ratio and performance. Evicting an already cached item and caching a new item in place of the evicted item involve write operations. These write operations significantly slow the ability of the caching server to respond to a request relative to reads associated with fulfilling requests to already cached items. Moreover, each time the caching server evicts an item that is subsequently requested, the caching server loses performance by having to retrieve the item from an origin server before the item can be served in response to the request, whereas if the item was retained in cache, the retrieval operation could be avoided. Accordingly, the caching servers are configured with cache replacement methodologies to manage the selection and timing for cached content eviction.

Least recently used (LRU) and least frequently used (LFU) are two common cache replacement methodologies. Under LRU, content is evicted from cache according to recency of requests. Under LFU, content is evicted from cache according to frequency of requests.

From a holistic perspective, these cache replacement methodologies appear to adequately manage the cache storage while being lightweight so as to not create a bottleneck during times of high demand. However, closer analysis reveals various inefficiencies with these prior art methodologies.

It is possible under these methodologies for a few content providers to disproportionately consume the cache at the expense of other content providers. Consequently, only a few content providers benefit from the efficiencies afforded by the cache, while other content providers receive little or no such benefit. These inefficiencies primarily arise because the prior art cache replacement methodologies treat content or content providers the same. As a result, a first content provider with ten times more content than a second content provider could have a tenfold greater cache footprint than the second content provider even when the content of the second content provider is served from the cache more often than the content of the first content provider. Similarly, a first content provider with large sized content could have a larger cache footprint than a second content provider with small sized content even when the small sized content is served from the cache more often than the large sized content.

Accordingly, there is a need to better manage how and what content is evicted from cache. To this end, there is a need for cache replacement methodologies that are not based and guided by a single factor or criterion. There is a further need to provide differentiated and configurable access to the cache while preserving a lightweight and scalable implementation.

BRIEF DESCRIPTION OF THE DRAWINGS

In order to achieve a better understanding of the nature of the present invention, a preferred embodiment for deterministic multifactor cache replacement will now be described, by way of example only, with reference to the accompanying drawings in which.

DETAILED DESCRIPTION

Deterministic multifactor cache replacement is provided to modify caching server operation, and more specifically, to optimize cache utilization and caching performance of the caching server. In some embodiments, the deterministic multifactor cache replacement modifies caching server eviction operation for specific traffic or content patterns. In some embodiments, the deterministic multifactor cache replacement modifies caching server eviction operation for granular control over an item's lifetime on cache, thereby caching and serving content provider content according to individual content provider or content caching requirements.

The caching server can be any network enabled device, machine, or appliance that temporarily stores content from one or more content providers in order to optimize the delivery of such content to requesting end users. The caching server can be a standalone machine, such as a proxy server. Alternatively, the caching server can be part of a content delivery network (CDN) or other network of caching servers. The caching server is typically geographically more proximate to a set of requesting end users than origin servers of the content providers whose content is cached by caching server. The geographic proximity allows the caching server to serve the cached content to the end users with less latency than if the end users were to receive the content from origin servers of the content providers.

The caching server can leverage one or more types of memory or storage for content caching including magnetic disk, solid state drives, and random access memory (RAM), as some examples. Components forming a caching server of some embodiments are presented and described with reference to FIG. 8 below.

The deterministic multifactor cache replacement is periodically performed when the caching server cache is either full or experiences usage that is above a preset threshold. During each replacement iteration, the caching server selects one or more cached items deterministically and according to two or more factors and deletes the selected cached items from cache until the cache utilization drops below the present threshold.

In some embodiments, the deterministic multifactor cache replacement assigns an eviction score to each content item in cache or a subset of the cached items. The score computation and assignment can occur during each replacement iteration. The caching server then evicts the cached items with the highest eviction scores until a sufficient or desired amount of cache is freed or until the available cache complies with the preset threshold.

The eviction score for a particular item in the caching server cache is derived from at least two or more factors associated with the particular item. The equation below identifies a function producing an eviction score for a cached content item based on four different factors associated with the cached content item:

$$\text{score} = F(\text{item\_factor1}, \text{item\_factor2}, \text{item\_factor3}, \text{item\_factor4}) \quad (1)$$

Separate functions can be used to independently compute a sub-score for each factor. The overall eviction score can be derived from these sub-scores. Alternatively, the function identified in (1) above can produce the overall eviction score directly from the factors. In some embodiments, the multiple factors contributing to the eviction score for a particular item include at least two or more of: age, size, cost, and content type. Other factors can also be used in the eviction score derivation.

The age factor is derived based on the amount of time that has passed since a particular cached item was last requested. The caching server may associate or update a timestamp each time the particular cached item is requested. From the timestamp, the particular content item age can be determined.

The size factor is determined from the content file size or the amount of storage consumed to cache the particular content item. The caching server can determine a cached item's size at runtime using a stat( ) UNIX system call.

The cost factor is a premium a content provider pays the caching server for caching or delivery of the content provider content. For instance, the content provider may expect large demand for its content. Accordingly, the content provider can pay the caching server operator to guarantee that the content provider content is cached for some period of time so that it can be efficiently served from the caching server cache. In a distributed platform, such as a CDN, the cost can increase based on the number of CDN caching servers caching the content.

The content type factor differentiates content according to any of multiple differentiators. The content type can differentiate live from linear streaming content, media from other content, static from dynamic content, and high quality from low quality content as some examples.

The deterministic multifactor cache replacement set forth herein improves upon and differs from the single factor cache replacement techniques of the prior art. Least recently used (LRU) is a prominent prior art cache replacement technique that bases the replacement solely on age. An inefficiency of the single factor LRU implementation is that it does not differentiate content on the basis of size. In other words, large size and small size content are treated equally. As a result, LRU can evict a small content item because it is the least recently used item. However, it may be more efficient to evict a large content item instead to allow many small content items to be cached in place of the large content item. Replacing one large content item with several small content items in cache could increase the caching server cache-hit ratio, and thereby improve overall caching server performance. Alternatively, the caching server operator may prefer to replace one or more small content items in place of a large content item because of the lengthy cache fill operation needed to enter the large content item in cache. In any case, LRU does not differentiate which content is evicted on the basis of size. LRU therefore prevents the caching server operator from tuning performance for these and other scenarios, and can therefore lead to suboptimal caching server performance.

To resolve these and other inefficiencies of prior art single factor cache replacement techniques, some embodiments generate eviction scores for cached content items based on a combination of factors including item age and size on disk. The two factor eviction score is then used to modify and control caching server operation in performing cache replacement.

In some embodiments, the multifactor eviction score is computed as:

$$\text{score} = (w\_\text{age} * \text{item\_age\_factor\_score}) + (w\_\text{size} * \text{item\_size\_factor\_score}) \quad (2)$$

w_age and w_size represent weights for adjusting the impact that an item's age or item's size has on the overall eviction score. The weights are set between 0 and 1. Different weights produce different eviction results. Setting w_age and w_size to values other than 0 and 1, wherein the combined sum of the values equals 1, enables the caching server operator to distribute the contribution of each factor towards the overall eviction score. Using a value of 0.5 for both these weights produces an even contribution of each factor.

In some embodiments, the weights can range between −1 and 1. The negative and positive value ranges provide further tuning with respect to the positive or negative impact that each factor has on the multifactor eviction score.

The item_age_factor_score is a value based on the amount of time that has passed since a particular cached item was last requested. The value can be computed using a linear function or a cubic function in some embodiment. Other functions or variations of the linear and cubic functions presented below could also be used to compute the item_age_factor_score.

A linear function for computing the item_age_factor_score in accordance with some embodiments is:

$$T\_i = (\text{age of item } i)/(\text{age of oldest item in cache}) \quad (3)$$

The letter "i" identifies a particular item. The linear function increases the age score as the item's age increases.

The increase is directly correlated and has a one-to-one correspondence to time since the last request.

A cubic function for computing the item_age_factor_score in accordance with some embodiments is:

$$T\_i = ((\text{age of item } i)/(\text{age of oldest item in cache}))^3 \quad (4)$$

The cubic function increases the score more aggressively as the item's age increases. In other words, the cubic function imposes a larger penalty on cached items that have not been recently requested than the linear function. Of course, by assigning a negative value to the w_age weight parameter, the penalty can be converted to a benefit. The negative weight value is used for prioritizing the replacement of cached content that has been recently requested over cached content that has not been recently requested.

Figure 1:
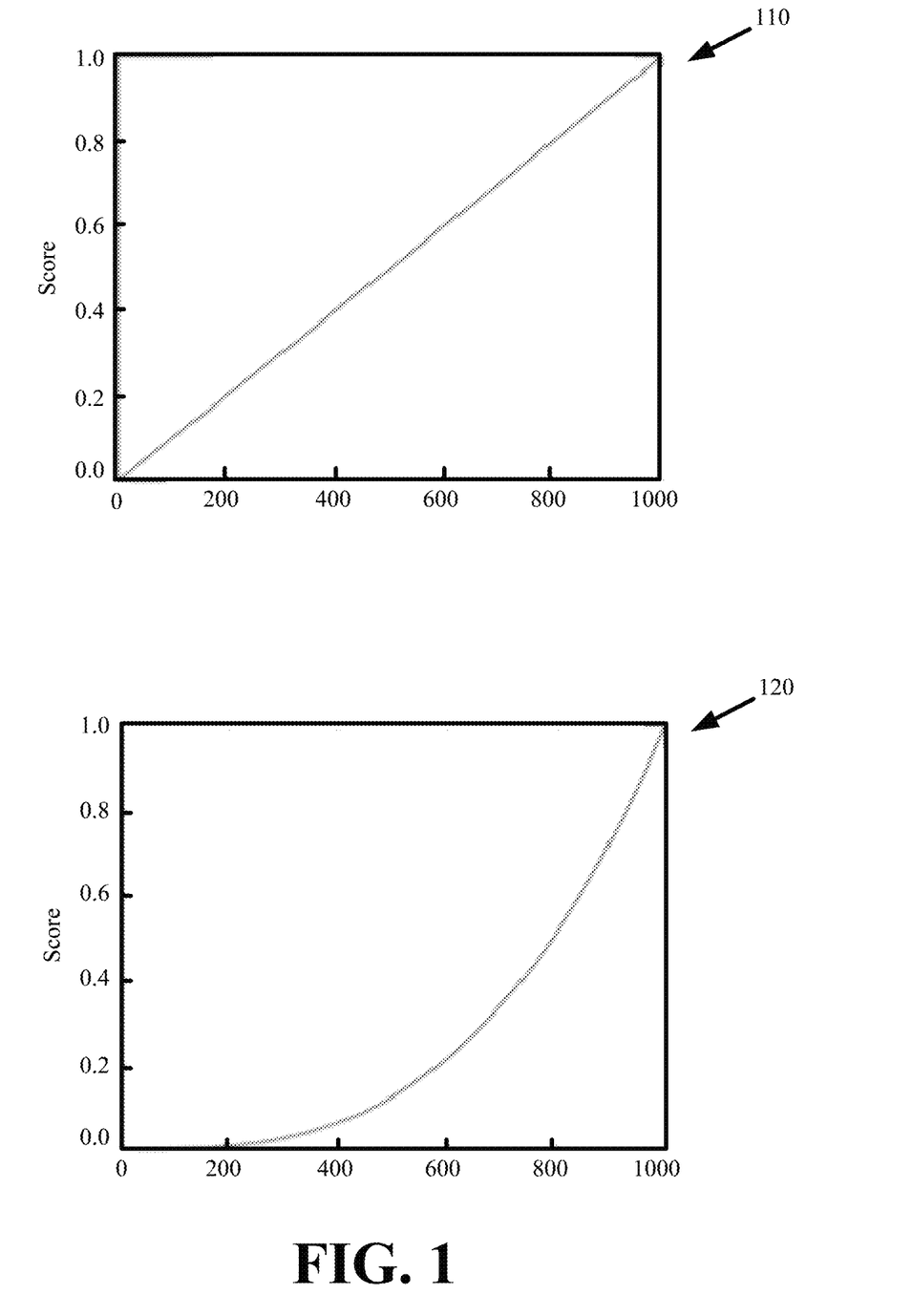
FIG. 1 presents a side-by-side illustration of the item_age_factor_score derived from a linear function and from a cubic function of some embodiments.

FIG. 1 presents a side-by-side illustration of the item_age_factor_score derived from the linear function (3) and from the cubic function (4) of some embodiments. The linear function (3) derived item_age_factor_score is illustrated by graph 110 and the cubic function (4) derived item_age_factor_score is illustrated by graph 120. Each graph 110 and 120 depicts time since last request along the x-axis and the resulting score from the function at different times along the y-axis, wherein the score is bounded between 0 and 1.

The item_size_factor_score is a value that can be derived independent of or dependent on the available cache. In some embodiments, the item_size_factor_score is derived independent of the available cache size by basing the value on the item size. In some embodiments, the item_size_factor_score is derived dependent on the available cache size by basing the value on a percentage of cache that is reserved to cache a particular item. In some embodiments, the item_size_factor_score is dependent on the size (mean and standard deviation) of other items residing in cache. The item_size_factor_score penalizes items with a larger size or that require a greater amount of cache more than items with a smaller size or that require a lesser amount of cache. Here again, negative weights can be assigned to the w_size parameter in order invert the item_size_factor_score from a penalty to a benefit.

A linear function for computing the item_size_factor_score in accordance with some embodiments is:

$$S\_i = (\text{size}\_i - \mu)/(6*\sigma) + 0.5 \quad (5)$$

This linear function increases the item_size_factor_score linearly as the item's size increases relative to the average size of cached items. The symbol "$\mu$" represents the running mean of log of item size. The symbol "$\sigma$" represents the running standard deviation of log of item size. Lastly, "size_i" represents log of the size of a particular item i. In some embodiments, log of sizes is used where the log of the item sizes represents the distribution nature of content across the caching server cache or larger CDN. In some embodiments, other size functions can be used as well for representing other kinds of stored content distributions.

An s-curve function for computing the item_size_factor_score in accordance with some embodiments is:

$$S\_i = (((\text{size}\_i - \mu)/6*\sigma)^{\wedge}(1/3) + 0.5^{\wedge}(1/3))*(1/6) \quad (6)$$

In (6) above, the item_size_factor_score is based on a sigmoid function. According to this function, the size score changes more aggressively as a given item's size deviates from the mean item size.

Figure 2:
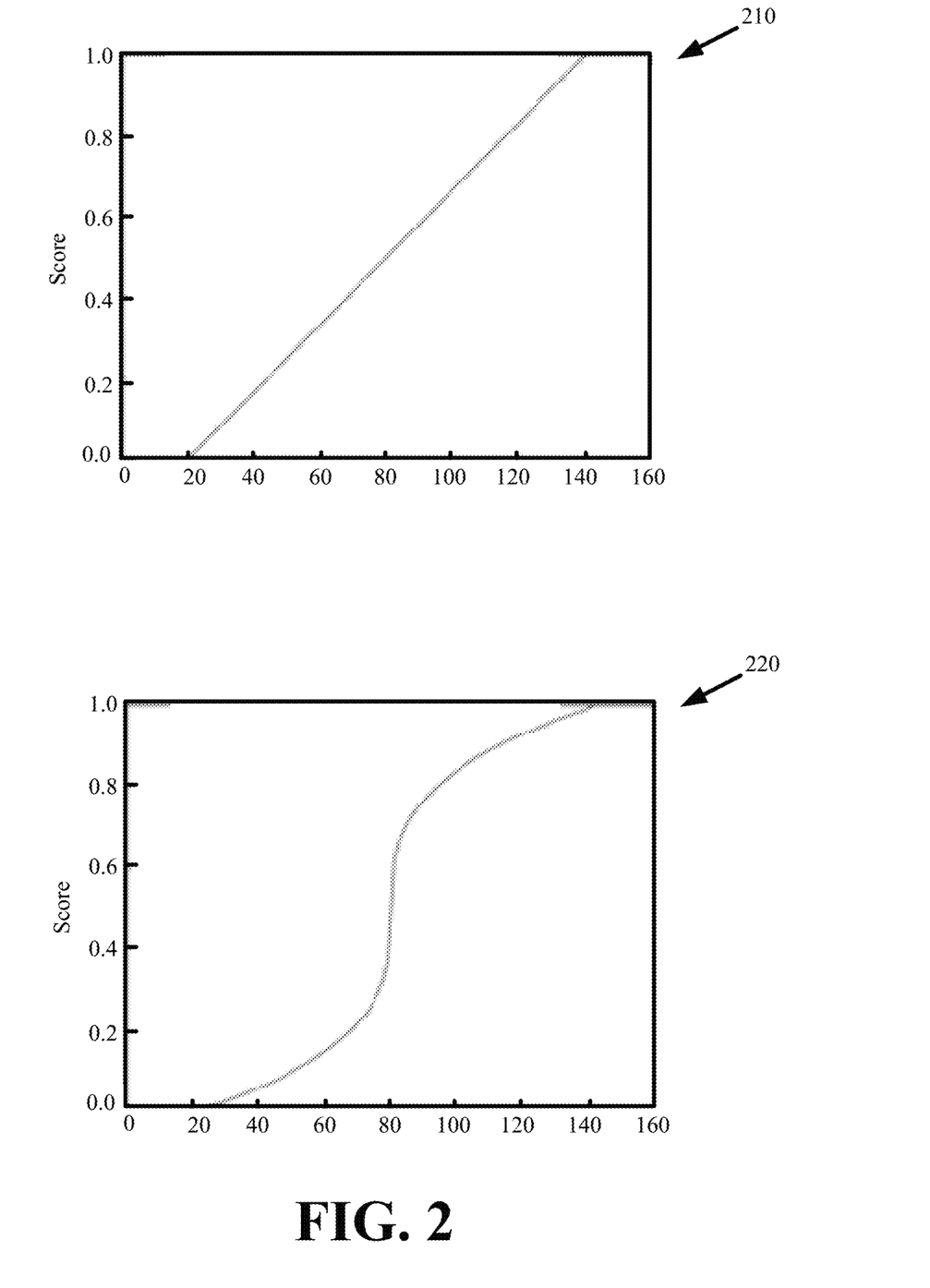
FIG. 2 presents a side-by-side illustration of the item_size_factor_score derived from a linear function and from an s-curve function of some embodiments.

FIG. 2 presents a side-by-side illustration of the item_size_factor_score derived from the linear function (5) and from the s-curve function (6) of some embodiments. The linear function (5) derived item_size_factor_score is illustrated by graph 210 and the s-curve function (6) derived item_size_factor_score is illustrated by graph 220. Each graph 210 and 220 depicts item size along the x-axis and the score along the y-axis, wherein the score is bounded between 0 and 1.

The eviction score used by the caching server in selecting content items to replace from cache can be generated from any combination of the above and other functions for computing the item_age_factor_score and item_size_factor_score. For instance, a first eviction score can be generated from combining the linear function item_age_factor_score with the s-curve function item_size_factor_score and a different second eviction score can be generated from combining the cubic function item_age_factor_score with the linear function item_size_factor_score. It should be noted that these and other presented functions have been tuned for specific traffic patterns encountered by caching servers of a CDN. As the traffic pattern changes, corresponding changes can be made to the functions.

Figure 3:
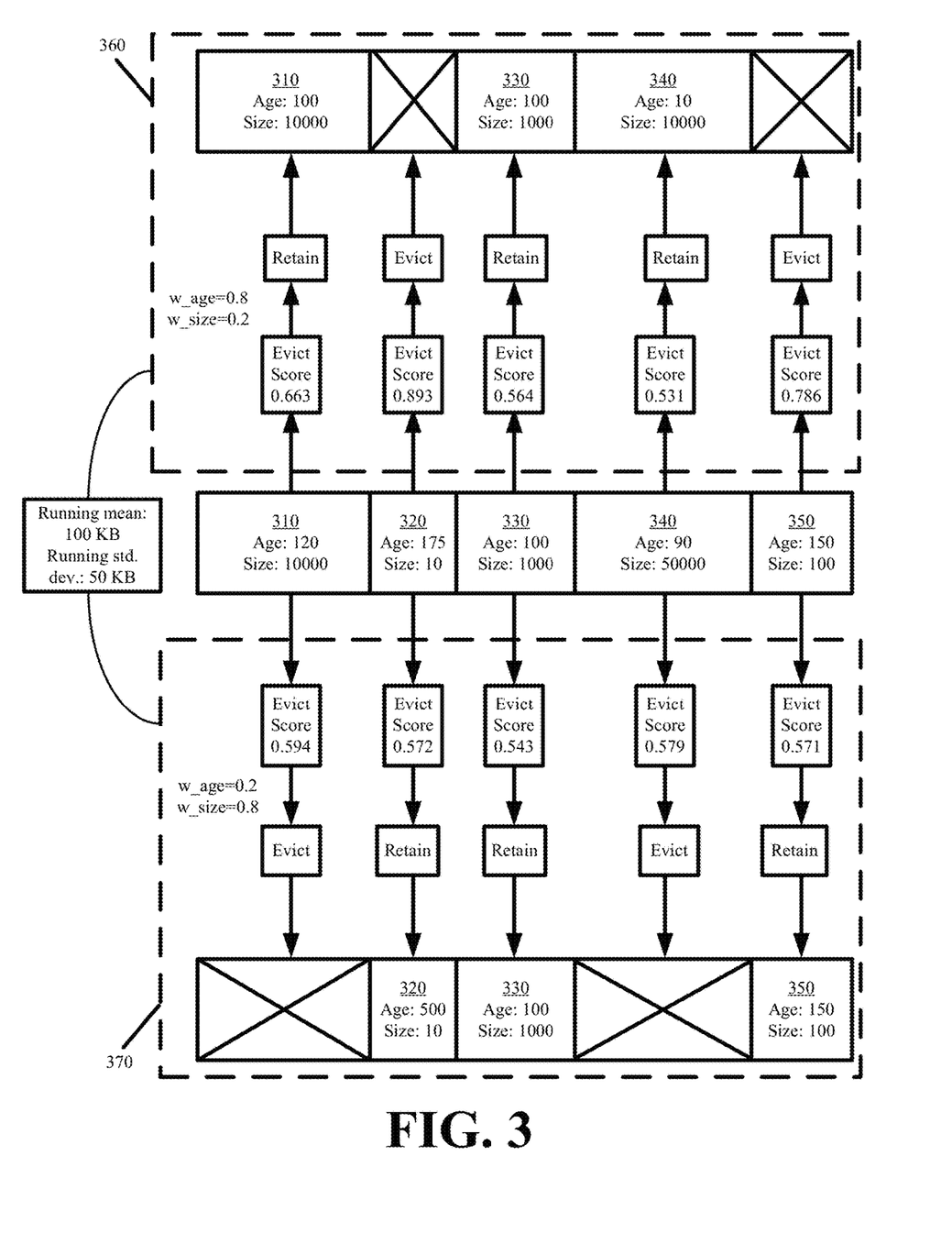
FIG. 3 illustrates modified caching behavior of the caching server resulting from assigning different weights to the item_age_factor_score linear function and the item_size_factor_score linear function for the multifactor eviction score of some embodiments.

The caching server can be configured to operate and manage cache according to the eviction scores of some embodiments. FIG. 3 illustrates modified caching behavior of the caching server resulting from assigning different weights to the item_age_factor_score linear function (3) and the item_size_factor_score linear function (5) for the multifactor eviction score of some embodiments.

FIG. 3 illustrates an exemplary caching server storage caching five different items 310, 320, 330, 340, and 350. The age and size of each item 310, 320, 330, 340, and 350 is presented. The figure then illustrates different caching server operation resulting from configuring different weights for the w_age and w_size parameters of the multifactor eviction score of (2) during different eviction iterations 360 and 370. In computing the item_size_factor_score in this figure and the figures below, a running mean of 100 kilobytes (KB) and a running standard deviation of 50 KB is assumed. In other words, these values reflect the running mean and running standard deviation of all items in cache and not only those depicted in the figures.

360 illustrates modified caching server operation resulting from configuring the w_age parameter to a value of 0.8 and the w_size parameter to a value of 0.2 for an eviction iteration. Based on the running mean of 100 KB, $\mu$ is 16.64 or log 2(100*1024 bytes), wherein log 2 is log base 2. Based on the running standard deviation of 50 KB, $\sigma$ is 15.64 or log 2(50*1024 bytes). The resulting eviction score for item 310 with w_age set to 0.8 and w_size set to 0.2 is 0.663 or (0.8*(120/175))+(0.2*((log 2(10000*1024 bytes)−16.64)/(6*15.64)+0.5)).

The values and the eviction scores produced from these values cause the caching server to prioritize the replacement of older content over larger content. As shown, the eviction scores cause the caching server to select and evict items 320 and 350 from cache.

370 illustrates modified caching server operation resulting from configuring the w_age parameter to a value of 0.2 and the w_size parameter to a value of 0.8 for a different eviction iteration. The resulting eviction scores cause the caching server to prioritize the replacement of larger content over older content. In this case, the eviction scores cause the caching server to select and evict items 310 and 340 from cache.

Some embodiments perform item eviction based on a multifactor eviction score with variable rate scoring. In some such embodiments, the eviction score is computed as:

$$\text{score} = \text{item\_age} * (w\_size * \text{item\_size\_factor\_score} + 1) \quad (7)$$

Function (7) removes the w_age parameter, thereby providing an administrator a simpler interface for tuning the impact that item age and size have on the overall eviction score. In function (7), item_age represents the duration in time since an item was last requested. Since w_age is not used, w_size is not required to be bounded between −1 and 1 and can be set to higher (or lower—if converting larger sizes from being a penalty to a benefit) values to increase the contribution of item's size towards the overall eviction score. In some such embodiments, the w_size can be set to a value between −100 and 100. Function (7) provides a variable rate of change in the eviction score over time instead of a constant rate of change. Thus, larger items will receive a higher rate of increase in their overall eviction score compared to smaller items. This variable rate of change is illustrated in FIG. 4.

Figure 4:
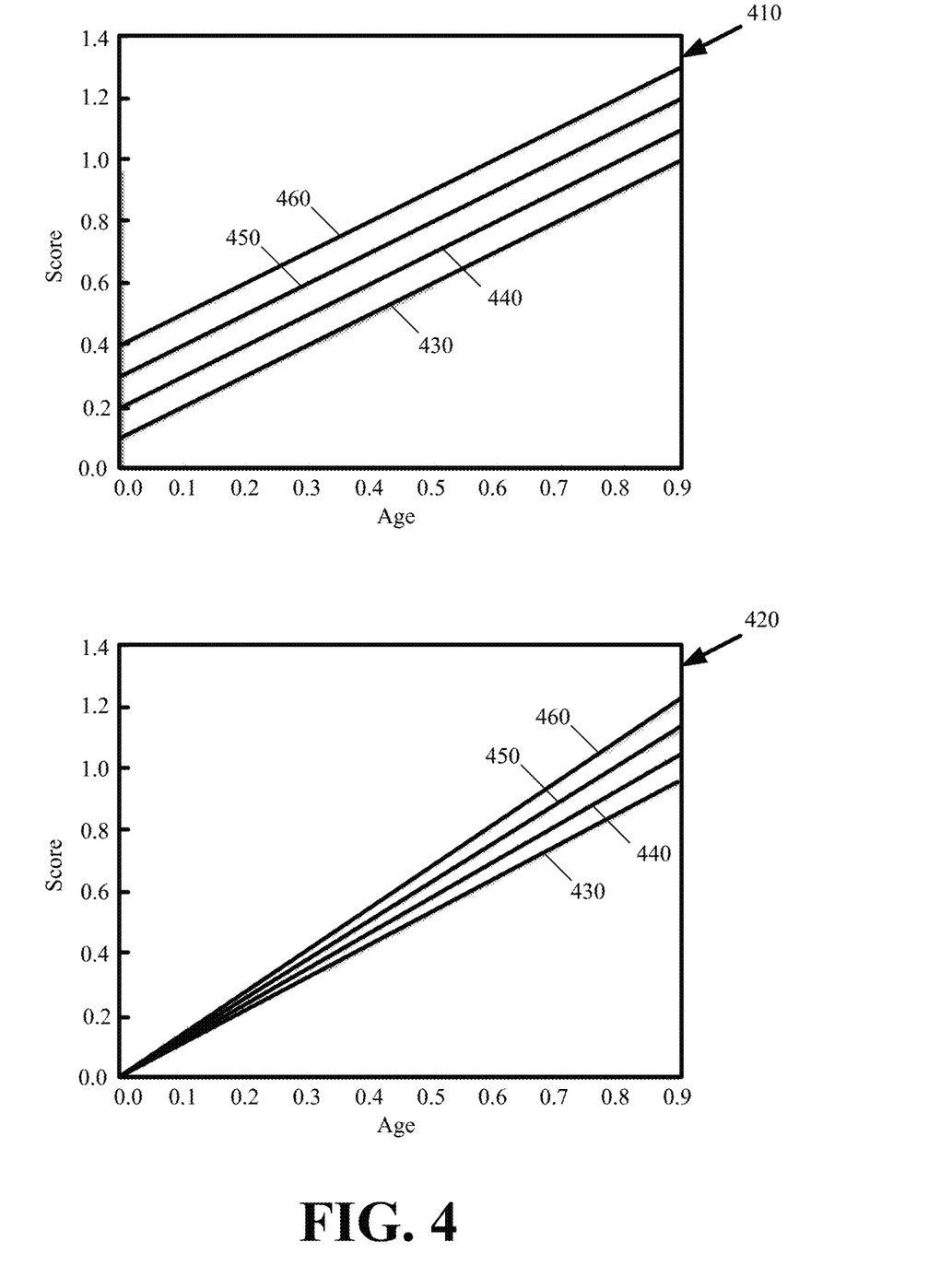
FIG. 4 provides two graphs illustrating scores for four items with sizes in increasing order computed according to constant rate of change and a variable rate of change in accordance with some embodiments.

FIG. 4 provides two graphs 410 and 420. Graph 410 illustrates scores for four items 430, 440, 450, and 460 with sizes in increasing order computed using the constant rate of change from function (2). For instance, the item_size_factor_score can be 0.1 for item 430, 0.2 for item 440, 0.3 for item 450, and 0.4 for item 460. Graph 420 illustrates scores for the same four items 410, 420, 430, and 440 computed using the variable rate of change from function (7). Graph 420 illustrates how the variable rate of change increases scores faster for larger items than the constant rate of change of graph 410. An administrator can therefore use the variable rate of change to penalize larger items more over time relative to the constant rate of change.

Some embodiments perform item eviction based on a multifactor eviction score with configurable item override. These embodiments extend the two factor eviction scores of (2) and (7) to also account for factors other than age and size. As noted above, additional factors from which the eviction score can be derived include cost and content type. With these additional factors included in the eviction score derivation, the caching server operation can be modified to purge certain types of content earlier than other types of content while continuing to account for content size and age in performing the replacement. In some embodiments, the multifactor eviction score with configurable item override is computed as:

$$\text{score}=(\text{item\_age}-\text{item\_eviction\_TTL})*\text{item\_eviction\_accelerator}*(\text{w\_size}*\text{item\_size\_factor\_score}+1) \quad (8)$$

The item_eviction_TTL parameter can be used to exclude an item from cache eviction for a certain time period. The item_eviction_TTL parameter is therefore a retention parameter for modifying the caching server operation in order to guarantee the availability of certain items or content in cache. This parameter therefore links to the cost factor. A content provider that pays to guarantee presence of its content in caching server cache will be provided a longer item_eviction_TTL than content of other content providers that do not pay to guarantee presence of their content in cache. Similar to function (7), item_age represents the duration in time since an item was last requested. Since w_age is not used, w_size is not required to be bounded between −1 and 1 and can be set to higher or lower values to increase the contribution of item's size towards the overall eviction score.

The item_eviction_accelerator parameter can be used to accelerate the rate at which the eviction score for a particular item increases relative to other items. This parameter therefore links to the content type factor. For instance, there is no need to continue to cache live content after a small age. By increasing the item_eviction_accelerator parameter for live content, the caching server computes an eviction score for the live content and increases the score by the item_eviction_accelerator value, thereby causing this particular type of content (i.e., live content) to be evicted sooner than other types of content cached by the caching server. The item_eviction_accelerator parameter can be defined on a per customer or per content type basis. For instance, a rule can be set in a caching server configuration specifying an accelerator value that is double a default value for live content with a ".ts" file extension. The caching server can differentiate different types of content by referencing content filename extensions or metadata.

With these additional parameters, caching server operation can be modified to tune the lifetime of particular items in cache on an individual basis. More specifically, the caching server can differentiate content during eviction iterations on the basis of content age, size, cost, and content type in some embodiments.

Figure 5:
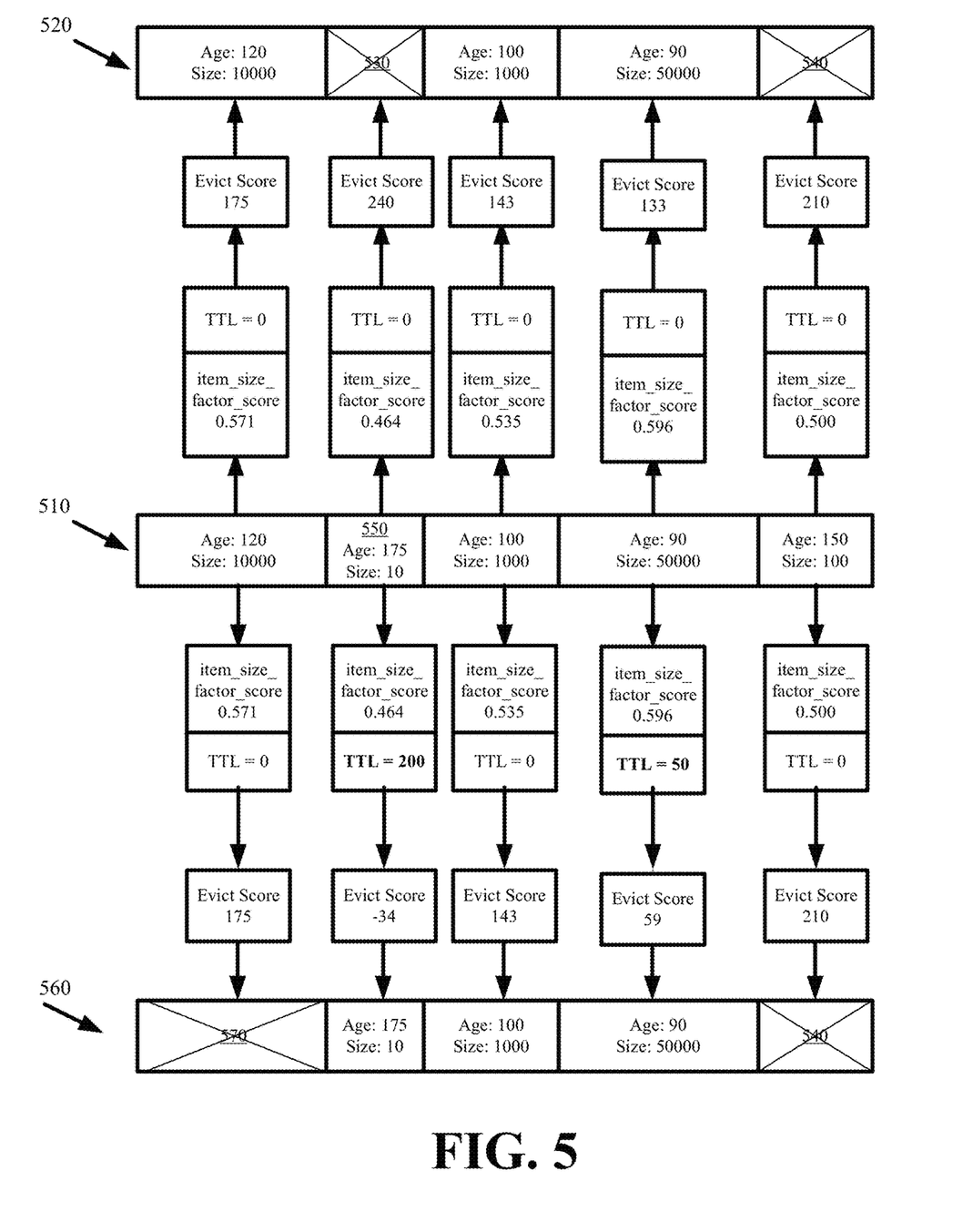
FIG. 5 conceptually illustrates altering caching server eviction operation by modifying the item_eviction_TTL parameter in accordance with some embodiments.

FIG. 5 conceptually illustrates altering caching server replacement operation by modifying the item_eviction_TTL parameter in accordance with some embodiments. The figure illustrates the caching server cache prior to an eviction iteration at 510. The cache is populated with different content from different content providers. The figure illustrates the item_age, item_size, and the item_size_factor_score for each cached item during the eviction iteration. The figure illustrates a first set of eviction scores that are produced from the item_age, the item_size_factor_score, a constant w_size parameter of 0.8, and from setting the item_eviction_TTL parameter to 0 or a common value for all cached items when the cached content is not differentiated based on cost. The caching server produces a first eviction result at 520 based on the first set of eviction scores, wherein the first eviction result at 520 results in cached items 530 and 540 being evicted from cache. The figure also illustrates a second set of eviction scores that are produced from the same item_age, item_size_factor_score, the constant w_size parameter, and from setting the item_eviction_TTL parameter for item 550 to a value guaranteeing its retention in cache. For instance, the eviction score for item 550 is −34 or (175−200)*(0.8*((log 2(10*1024 bytes)−16.64)/(6*15.64)+0.5)+1). The caching server produces a second eviction result at 560 based on the second set of eviction scores, wherein the second eviction result at 560 results in cached items 540 and 570 being evicted from cache. As can be seen, the caching server evicts different content in the first eviction result at 520 than in the second eviction result at 560, thereby demonstrating how the item_eviction_TTL parameter introduces the cost parameter in the cache eviction performed by the caching server.

Figure 6:
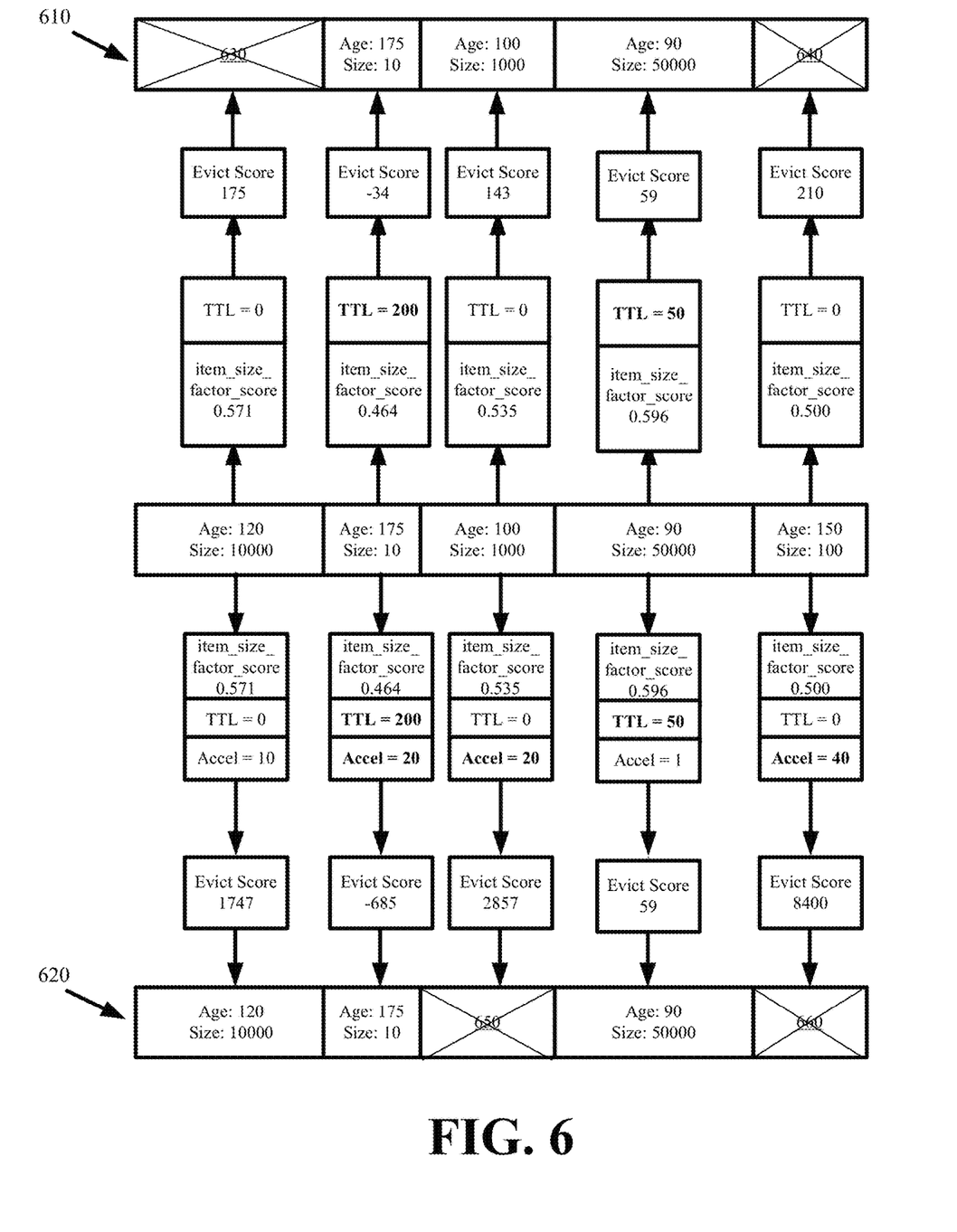
FIG. 6 illustrates altering caching server replacement operation by using the item_eviction_accelerator parameter to accelerate the purging of smaller content items in accordance with some embodiments.

FIG. 6 illustrates altering caching server eviction operation by using the item_eviction_accelerator parameter to accelerate the purging of smaller content items in accordance with some embodiments. The figure illustrates a first eviction result at 610 when the eviction of no content type is accelerated and a second eviction result at 620 when the eviction of the smaller content items are accelerated. As shown, the first eviction result at 610 evicts items 630 and 640, whereas the second eviction result at 620 evicts items 650 and 660. The eviction score for item 650 with the acceleration parameter set to 20 is 2857 or (100−0)*20*(0.8* ((log 2(1000*1024 bytes)−16.64)/(6*15.64)+0.5)+1).

In some embodiments, it becomes increasingly resource intensive for the caching server to continually compute eviction scores for each of the cached items as cache sizes increase and the number of cached items also increases. Accordingly, some such embodiments provide deterministic multifactor cache replacement with selective item scoring. In some such embodiments, the caching server computes eviction scores for a subset of the cached items at each of eviction iteration.

Figure 7:
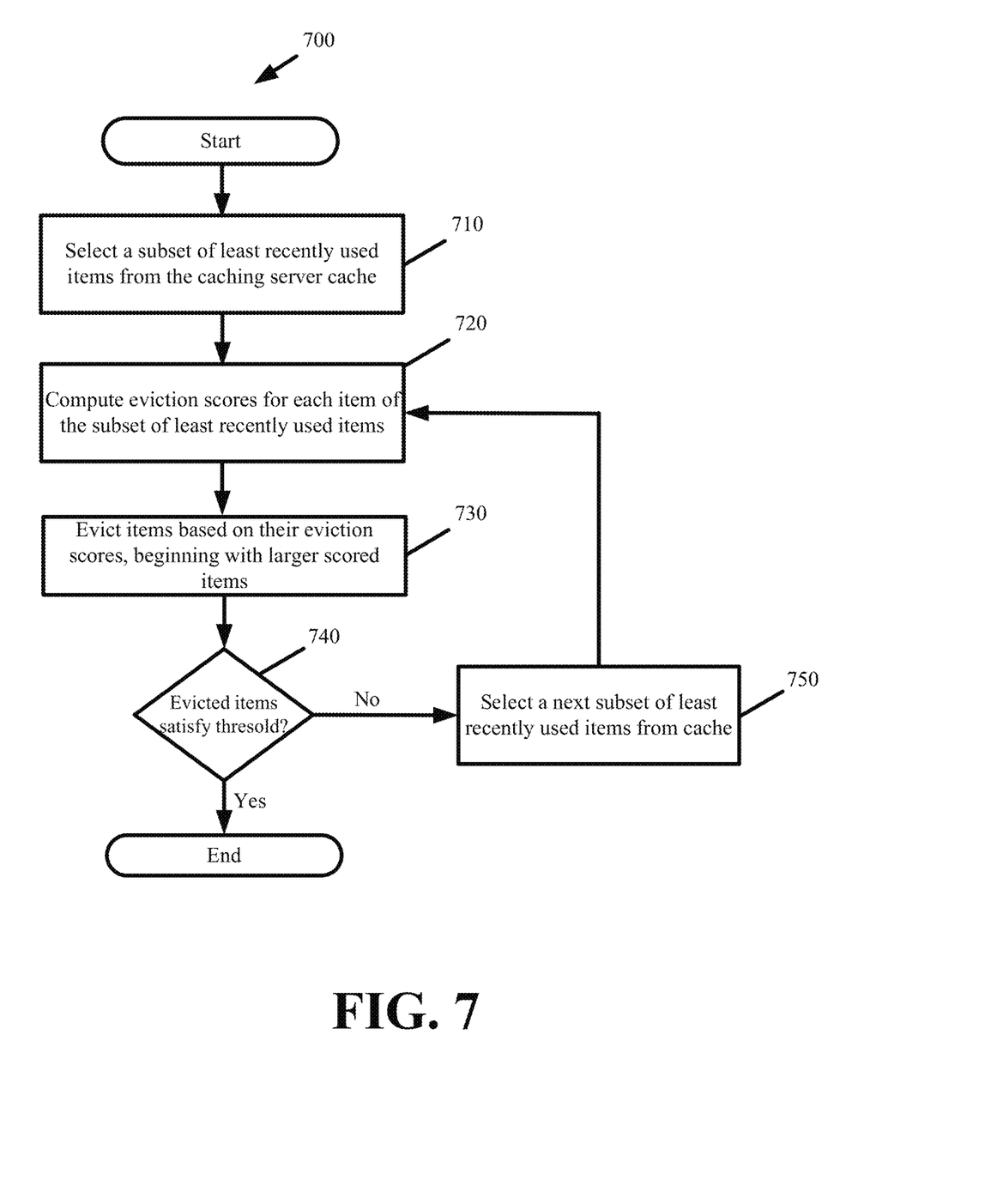
FIG. 7 presents a process by which the caching server performs deterministic multifactor cache replacement with selective item scoring in accordance with some embodiments.

FIG. 7 presents a process 700 by which the caching server performs deterministic multifactor cache replacement with selective item scoring in accordance with some embodiments. The process is performed at each eviction iteration of the caching server. In other words, the process can be performed when the caching server periodically cleans the cache or when the cache utilization exceeds a preset threshold.

The process selects (at 710) a subset of least recently used items from the caching server cache. The size of this subset can be determined based on the feasible number of items that the caching server can compute scores for.

The process computes (at 720) eviction scores for each item in this subset of least recently used items. The eviction scores are computed according to any of the different eviction score functions identified above. In particular, the eviction score functions can be formed by any function combination that accounts for two or more of the age, size, cost, and content type factors.

The process evicts (at 730) items based on their eviction scores, beginning with larger scored items. The process determines (at 740) if the items evicted at step 730 have freed enough cache to satisfy a threshold. If so, the process ends with the caching server having computed eviction scores for just the subset of least recently used items. Otherwise, the process selects (at 750) a next subset of least recently used items and reverts to step 720. Instead of step 750, some embodiments add new items to the selected subset of items as other items from the subset of items are evicted before reverting to step 720 until the threshold is satisfied.

The caching server eviction operation can be configured by any combination and weighting of the above functions. Each combination and weighting changes the retention or eviction priority of cached content. Stated differently, changing the w_age, w_size, item_eviction_TTL, and item_eviction_accelerator parameters and combining these parameters with different functions (e.g., linear, cubic, s-curve, etc.) for computing any of age score and size score components of the eviction score prioritizes different content for retention or eviction from the caching server cache. Accordingly, the embodiments offer more granular control over cache eviction than single factor prior art methodologies, such as LRU or LFU as some examples.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 8:
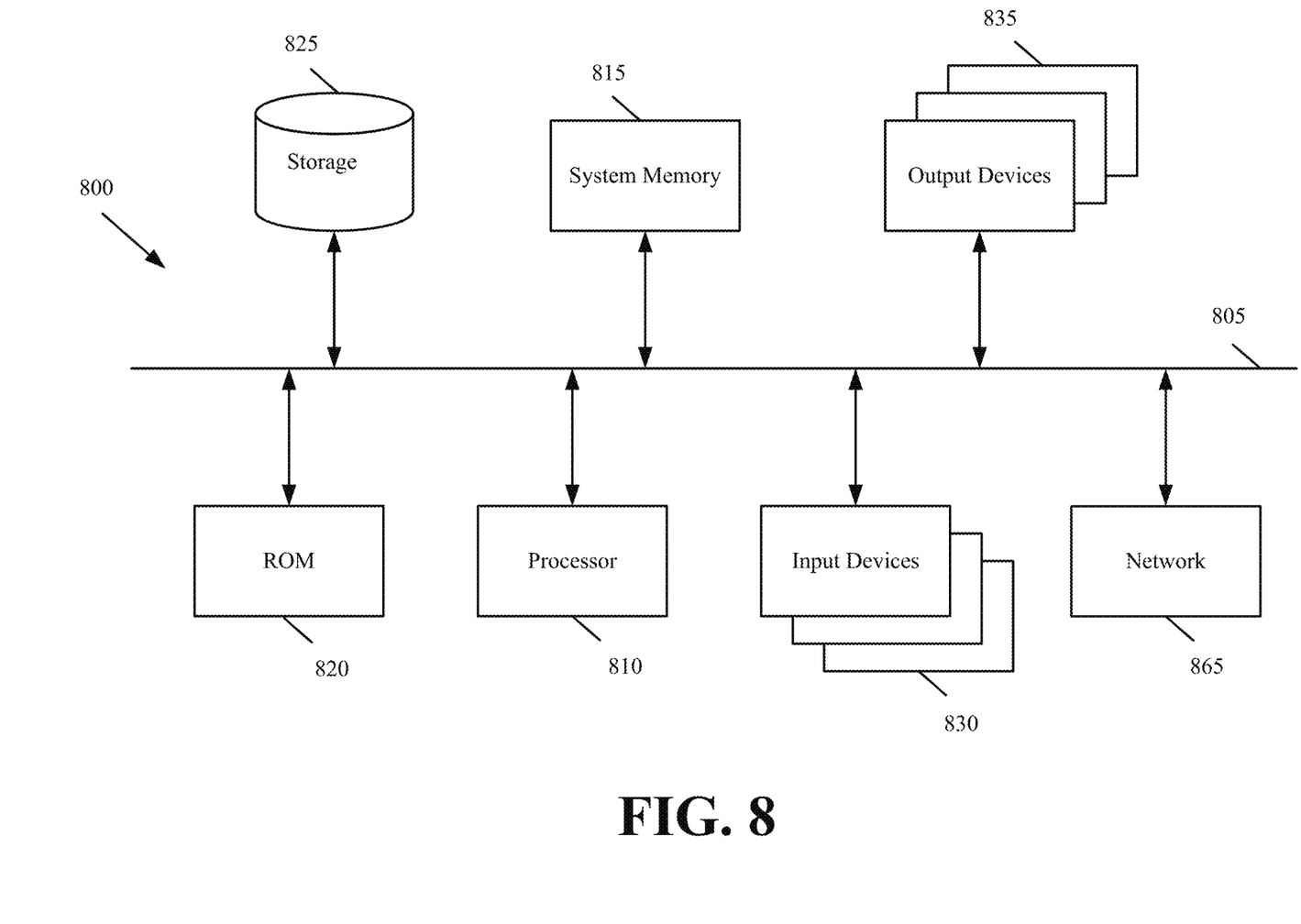
FIG. 8 illustrates a computer system or server with which some embodiments are implemented.

FIG. 8 illustrates a computer system or server with which some embodiments are implemented. Such a computer system includes various types of computer-readable mediums and interfaces for various other types of computer-readable mediums that implement the various methods and machines described above (e.g., caching server). Computer system 800 includes a bus 805, a processor 810, a system memory 815, a read-only memory 820, a permanent storage device 825, input devices 830, and output devices 835.

The bus 805 collectively represents all system, peripheral, and chipset buses that communicatively connect the numerous internal devices of the computer system 800. For instance, the bus 805 communicatively connects the processor 810 with the read-only memory 820, the system memory 815, and the permanent storage device 825. From these various memory units, the processor 810 retrieves instructions to execute and data to process in order to execute the processes of the invention. The processor 810 is a processing device such as a central processing unit, integrated circuit, graphical processing unit, etc.

The read-only-memory (ROM) 820 stores static data and instructions that are needed by the processor 810 and other modules of the computer system. The permanent storage device 825, on the other hand, is a read-and-write memory device. This device is a non-volatile memory unit that stores instructions and data even when the computer system 800 is off. Some embodiments of the invention use a mass-storage device (such as a magnetic, solid-state disk, or optical disk and its corresponding disk drive) as the permanent storage device 825.

Other embodiments use a removable storage device (such as a flash drive or solid-state disk) as the permanent storage device. Like the permanent storage device 825, the system memory 815 is a read-and-write memory device. However, unlike storage device 825, the system memory is a volatile read-and-write memory, such as random access memory (RAM). The system memory stores some of the instructions and data that the processor needs at runtime. In some embodiments, the processes are stored in the system memory 815, the permanent storage device 825, and/or the read-only memory 820.

The bus 805 also connects to the input and output devices 830 and 835. The input devices enable the user to communicate information and select commands to the computer system. The input devices 830 include alphanumeric keypads (including physical keyboards and touchscreen keyboards), pointing devices. The input devices 830 also include audio input devices (e.g., microphones, MIDI musical instruments, etc.). The output devices 835 display images generated by the computer system. The output devices include printers and display devices, such as cathode ray tubes (CRT) or liquid crystal displays (LCD).

Finally, as shown in FIG. 8, bus 805 also couples computer 800 to a network 865 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 800 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, any other optical or magnetic media, and disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method comprising:
storing a plurality of items in computer storage with a first factor and a different second factor, the first factor and the second factor associated with different properties of an item;
increasing the first factor for a set of the plurality of items over time using a linear function;
initiating a purge of the computer storage at a first time, the purge associated with removing two or more items from the computer storage at the first time;
selecting the set of items based on the first factor, wherein the set of items comprises fewer items than the plurality of items; and
removing a subset of the set of items from the computer storage based on the second factor in satisfaction of the purge at the first time, wherein the subset of items comprises fewer items than the set of items.

2. The method of claim 1, wherein the initiating the purge comprises identifying usage of the computer storage exceeding a threshold at the first time.

3. The method of claim 1 further comprising adjusting the first factor and the second factor for each item of the set of items by different values, the different values summing to one.

4. The method of claim 1 further comprising assigning a time-to-live (TTL) parameter that is greater than zero to at least one particular item in the set of items.

5. The method of claim 4 further comprising excluding the particular item from the subset of items based on the particular item having the TTL parameter that is greater than zero.

6. The method of claim 1 further comprising providing a timestamp to each item of the plurality of items, wherein the timestamp indicates a last time when a corresponding item was last accessed.

7. The method of claim 6, wherein the selecting comprises determining the set of items from the plurality of items that have been least recently accessed based on the timestamp.

8. A method comprising:
storing a plurality of items in computer storage;
selecting a set of items from the plurality of items based on each item of the first of items having a first factor that satisfies a first condition, wherein the set of items comprises fewer items than the plurality of items;
computing an eviction score for each item of the set of items based on a different second factor of each item;
increasing the eviction score of items in the set of items that are of a particular content type faster than items in the set of items that are of another content type, wherein the increasing prioritizes removal of the items of the particular content type over other items; and
removing a subset of the set of items from the computer storage based on the eviction scores for the set of items, wherein the subset of items comprises fewer items than the set of items.

9. The method of claim 8, wherein the first factor and the second factor comprise a different one of item age, size, or content type.

10. The method of claim 8 further comprising providing a timestamp to each item of the plurality of items, wherein the timestamp indicates a last time when a corresponding item was last accessed.

11. The method of claim 10, wherein the selecting comprises determining the set of items from the plurality of items that have been least recently requested based on the timestamps.

12. The method of claim 8 further comprising increasing the eviction score of items in the set of items with particular sizes faster than items in the set of items with sizes that are different than the particular sizes, wherein said increasing prioritizes removal of the items with the particular sizes over other items.

13. The method of claim 8 further comprising increasing the eviction score of items in the set of items with particular ages faster than items in the set of items with ages that are different than the particular ages, wherein said increasing prioritizes removal of the items with the particular ages over other items.

14. A method comprising:
storing a plurality of items in computer storage with a first factor and a different second factor, the first factor and the second factor associated with different properties of an item;
increasing the first factor for a set of the plurality of items over time using a linear function;
initiating a purge of the computer storage at a first time, the purge associated with removing two or more items from the computer storage at the first time;
selecting the set of items based on the first factor, wherein the set of items comprises fewer items than the plurality of items; and
removing a subset of the set of items from the computer storage based on the second factor in satisfaction of the purge at the first time, wherein the subset of items comprises fewer items than the set of items.

15. A device comprising:
a non-transitory computer-readable medium storing a set of processor-executable instructions; and
one or more processors configured to execute the set of processor-executable instructions, wherein executing the set of processor-executable instructions causes the one or more processors to:
store a plurality of items in the non-transitory computer-readable medium;
select a set of items from the plurality of items based on each item of the first of items having a first factor that satisfies a first condition, wherein the set of items comprises fewer items than the plurality of items;
compute an eviction score for each item of the set of items based on a different second factor of each item;
increase the eviction score of items in the set of items with particular sizes faster than items in the set of items with sizes that are different than the particular sizes, wherein the increase prioritizes removal of the items with the particular sizes over other items; and
remove a subset of the set of items from the computer storage based on the eviction scores for the set of items, wherein the subset of items comprises fewer items than the set of items.

16. A device comprising:
a non-transitory computer-readable medium storing a set of processor-executable instructions; and
one or more processors configured to execute the set of processor-executable instructions, wherein executing the set of processor-executable instructions causes the one or more processors to:
store a plurality of items in the non-transitory computer-readable medium;
select a set of items from the plurality of items based on each item of the first of items having a first factor that satisfies a first condition, wherein the set of items comprises fewer items than the plurality of items;

compute an eviction score for each item of the set of items based on a different second factor of each item;
increase the eviction score of items in the set of items with particular ages faster than items in the set of items with ages that are different than the particular ages, wherein the increase prioritizes removal of the items with the particular ages over other items; and
remove a subset of the set of items from the computer storage based on the eviction scores for the set of items, wherein the subset of items comprises fewer items than the set of items.

* * * * *